(12) United States Patent
Herve et al.

(10) Patent No.: US 11,148,494 B2
(45) Date of Patent: Oct. 19, 2021

(54) SUSPENSION SYSTEM OF A VEHICLE AXLE

(71) Applicant: Volvo Truck Corporation, Gothenburg (SE)

(72) Inventors: Michel Herve, Lyons (FR); Stéphane Brun, Montceau les Mines (FR)

(73) Assignee: Volvo Truck Corporation, Gothenburg (SE)

( * ) Notice: Subject to any disclaimer, the term of this patent is extended or adjusted under 35 U.S.C. 154(b) by 12 days.

(21) Appl. No.: 16/496,545

(22) PCT Filed: May 15, 2017

(86) PCT No.: PCT/IB2017/000772
§ 371 (c)(1),
(2) Date: Sep. 23, 2019

(87) PCT Pub. No.: WO2018/211299
PCT Pub. Date: Nov. 22, 2018

(65) Prior Publication Data
US 2020/0269644 A1    Aug. 27, 2020

(51) Int. Cl.
*B60G 11/38* (2006.01)
*B60G 11/107* (2006.01)
*B60G 11/04* (2006.01)

(52) U.S. Cl.
CPC ............ *B60G 11/107* (2013.01); *B60G 11/04* (2013.01); *B60G 2202/112* (2013.01); *B60G 2204/121* (2013.01)

(58) Field of Classification Search
CPC .......... F16F 1/26; B60G 11/04; B60G 11/107; B60G 2202/112; B60G 2204/121
(Continued)

(56) References Cited

U.S. PATENT DOCUMENTS 1,586,164 A    5/1926    Tait
2,979,325 A    4/1961    Marquardt
(Continued)

FOREIGN PATENT DOCUMENTS

DE    1031653 B    6/1958
DE    1128308 B    4/1962
(Continued)

OTHER PUBLICATIONS

International Search Report and Written Opinion for International Patent Application No. PCT/IB2017/000772, dated Feb. 8, 2018, 15 pages.
(Continued)

*Primary Examiner* — Toan C To
(74) *Attorney, Agent, or Firm* — Withrow & Terranova, PLLC

(57) ABSTRACT

The invention relates to a suspension system of a vehicle axle, comprising: —a leaf spring (11); —a rear attachment device (24) which is configured to be secured to a vehicle frame (2) and which receives a rear end portion (14) of the leaf spring (11) so as to allow said leaf spring rear end portion to slide longitudinally relative to the rear attachment device; wherein: —the leaf spring rear end portion (14) forms at least part of a loop curved around a transverse axis, the loop being longitudinally elongated and having an opening (29) located at least at the front of said loop; —the rear attachment device (24) comprises a fastener (26) extending substantially transversally and received in said loop; —and the suspension system further comprises retaining means (30) configured to prevent the fastener (26) from getting out of the loop through the opening (29).

15 Claims, 2 Drawing Sheets

(58) Field of Classification Search
USPC .................................... 280/124.163, 124.17
See application file for complete search history.

(56) References Cited

U.S. PATENT DOCUMENTS

| | | | |
|---|---|---|---|
| 3,434,734 A | 3/1969 | Poulos | |
| 4,061,363 A * | 12/1977 | Symons | B60G 3/06 280/124.111 |
| 4,412,690 A * | 11/1983 | Prokop | B60G 5/047 267/262 |
| 5,219,151 A * | 6/1993 | Stewart | B60G 5/047 267/262 |
| 5,335,934 A * | 8/1994 | Hiller | B60G 11/107 267/260 |
| 5,636,857 A * | 6/1997 | Tandy, Jr. | B60G 9/00 267/31 |
| 5,683,076 A * | 11/1997 | Ingvarsson | F16F 1/185 267/47 |
| 6,015,158 A | 1/2000 | Overby | |
| 6,019,384 A * | 2/2000 | Finck | B60G 11/125 267/260 |
| 2010/0127444 A1 | 5/2010 | Glass | |
| 2012/0153589 A1 * | 6/2012 | McCarthy | B60G 11/10 280/86.75 |
| 2013/0127133 A1 | 5/2013 | Enomoto et al. | |
| 2014/0312543 A1 * | 10/2014 | Nakagawa | F16F 1/20 267/158 |
| 2015/0145187 A1 * | 5/2015 | Soles | B60G 11/42 267/30 |
| 2016/0159182 A1 * | 6/2016 | Cerri, III | F16C 17/02 403/380 |
| 2017/0313149 A1 * | 11/2017 | Chihara | B21D 53/886 |
| 2020/0001675 A1 * | 1/2020 | Herve | B60G 11/113 |
| 2020/0070609 A1 * | 3/2020 | Herve | B60G 11/04 |

FOREIGN PATENT DOCUMENTS

| | | |
|---|---|---|
| DE | 1929299 U | 12/1965 |
| DE | 7019331 U | 9/1970 |
| DE | 2312864 A1 | 9/1974 |
| DE | 2758721 A1 | 7/1979 |
| GB | 877185 A | 9/1961 |
| JP | S641145 U | 1/1989 |

OTHER PUBLICATIONS

Examination Report for European Patent Application No. 17735618.5, dated Mar. 9, 2021, 7 pages.

* cited by examiner

SUSPENSION SYSTEM OF A VEHICLE AXLE

This application is a 35 USC 371 national phase filing of International Application No. PCT/IB2017/000772, filed May 15, 2017, the disclosure of which is incorporated herein by reference in its entirety.

TECHNICAL FIELD

The invention relates to a suspension system of a vehicle axle.

The invention can be applied in heavy-duty vehicles, such as trucks, buses and construction equipment, but is not restricted to these vehicles.

BACKGROUND

A conventional suspension for a vehicle includes a leaf spring, made of one leaf or several superimposed leaves, which is arranged longitudinally adjacent and under a frame girder of the vehicle.

There are provided a front attachment device and a rear attachment device, both secured to the vehicle frame. The leaf spring front end portion is engaged in the front attachment device, generally with no degree of freedom along the longitudinal direction, while the leaf spring rear end portion is engaged in the rear attachment device so as to be able to slide longitudinally relative to the rear attachment device. Furthermore, the leaf spring comprises an intermediate portion engaged in an intermediate attachment device for attaching the vehicle axle to the vehicle frame.

For weight and cost reasons, single leaf springs made of a single leaf are more advantageous than those comprising several leaves. However, in the event of a leaf spring break, no leaf remains to ensure the vehicle safety.

More specifically, if the leaf spring breaks at its front portion, it is no more maintained in the longitudinal direction. As a result, the vehicle axle connected to the suspension system is not maintained either in the longitudinal direction, which poses serious problems in terms of safety.

Therefore, there is a need for an improved suspension system of a vehicle axle.

SUMMARY

An object of the invention is to provide a suspension system of a vehicle axle which is improved in terms of safety, and especially which ensures the vehicle can be at least stopped safely in case the leaf spring has been broken.

To that end, according to a first aspect, the invention concerns a suspension system of a vehicle axle comprising a leaf spring having a longitudinal axis and a transverse axis, the suspension system comprising a rear attachment device which is configured to be secured to a vehicle frame and which receives a rear end portion of the leaf spring so as to allow said leaf spring rear end portion to slide longitudinally relative to the rear attachment device, wherein:

- the leaf spring rear end portion forms at least part of a loop curved around a transverse axis, the loop being longitudinally elongated and having an opening located at least at the front of said loop;
- the rear attachment device comprises a fastener extending substantially transversally and received in said loop;
- and the suspension system further comprises retaining means configured to prevent the fastener from getting out of the loop through the opening.

Thus, in normal conditions, the leaf spring can be secured to the vehicle frame at its front end portion and can slide longitudinally relative to the vehicle frame at its rear end portion, in order to accommodate the axle vertical movements. This longitudinal degree of freedom is obtained by the longitudinal gap provided between the fastener and the front and/or rear inner surfaces of the loop which forms the leaf spring rear end portion and in which the fastener is received.

Furthermore, in case the leaf spring breaks forward of the axle, the leaf spring—and therefore the axle—remains at least partially maintained in the longitudinal direction. More precisely, by preventing the fastener from getting out of the loop through the opening which is located at the front of the loop, the axle is prevented from moving rearward above a predetermined limit. This ensures the driver can at least stop the vehicle safely. In addition, preventing the axle from moving forward—above a predetermined limit—would furthermore allow the driver to move the vehicle along some distance, typically to park it safely on the side of the road.

Such a leaf spring configuration in which the rear end portion forms at least part of a loop which is longitudinally elongated has many advantages. Indeed, the leaf spring rear end exhibits an upper surface which can be substantially flat, therefore increasing and improving the contact with an appropriate member of the rear attachment device, such as a pad. Besides, an oblong shape allows providing a longitudinal degree of freedom for the leaf spring, while not creating a piece that significantly protrudes below the vehicle frame.

The leaf spring rear end portion can voluntarily be designed as a partial loop having a large opening, for manufacturing, mounting and/or costs reasons. Alternatively, the leaf spring rear end portion can be designed as a nearly closed loop; however, it is not technically possible to fold or roll such a leaf spring into an elongated loop having a very little opening. Thus, in both cases, the opening of the leaf spring rear end portion is fairly large, and larger than the corresponding dimension of the fastener—typically the fastener diameter. Owing to the retaining means provided by the invention, the fastener may nevertheless be prevented to move longitudinally out of the loop through the opening. In other words, the retaining means allow limiting the rearward longitudinal movement of the leaf spring relative to the rear attachment device to a predetermined limit.

The invention is particularly favourable for a suspension system which comprises a single leaf spring, i.e. no back-up leaf for ensuring the system safety.

The retaining means can be a piece separate from the leaf spring.

The opening of the leaf spring rear end portion may extend over an angle of at least 10°, preferably at least 15° and/or over an angle which is less than 40°, preferably less than 30°, more preferably less than 25°. For example, said angle can range between 10° and 20°.

The retaining means can be located inside or outside the leaf spring rear end portion.

According to a first embodiment, the retaining means comprises a closure element facing the opening of the leaf spring rear end portion for closing the opening, or for partially closing the opening so that a remaining open portion of the opening is too small to allow the fastener to pass through it. In other words, the remaining open portion of the opening has a dimension which is smaller than the corresponding dimension of the fastener (such as its diameter for example).

The closure element can be substantially ring-shaped and located inside the loop. For example, the closure element may be elastically radially inwardly deformable from a rest position in which its radial dimensions are greater than the corresponding inner dimensions of the leaf spring rear end portion.

According to a second embodiment, the retaining means comprises a blocking element arranged on the fastener and configured to increase a dimension of the fastener to prevent the fastener to pass through the opening of the leaf spring rear end portion.

For example, the fastener comprises a pin and in the blocking element may comprise a sleeve arranged around said pin.

According to a third embodiment, the retaining means comprises a wall secured to the rear attachment device, rearward of the leaf spring rear end portion, said wall being arranged to form a stop preventing or limiting the rearward movement of the leaf spring.

The leaf spring rear end portion may form a partial loop having an opening which extends over an angle of at least 100°, preferably at least 150°, more preferably at least 180°, the leaf spring rear end portion having a curved rear surface for cooperating with said wall. Said curved rear surface may further form a hook capable of cooperating with the fastener for preventing a forward movement of the leaf spring relative to the vehicle frame.

Alternatively, the leaf spring rear end portion may form a nearly closed loop the opening of which extends over an angle which is less than 20°, for example.

The suspension system may further comprise a pad which is secured on the rear attachment device and which is in contact with the upper face of the leaf spring rear end portion.

In an embodiment, the suspension system can comprise a front attachment device configured to be secured to the vehicle frame and an intermediate attachment device, the leaf spring comprising a front end portion, preferably loop-shaped, which is engaged in said front attachment device and an intermediate portion engaged in said intermediate attachment device for attaching the vehicle axle to the vehicle frame.

According to a second aspect, the invention concerns a vehicle comprising a frame, an axle, and a suspension system as previously described.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
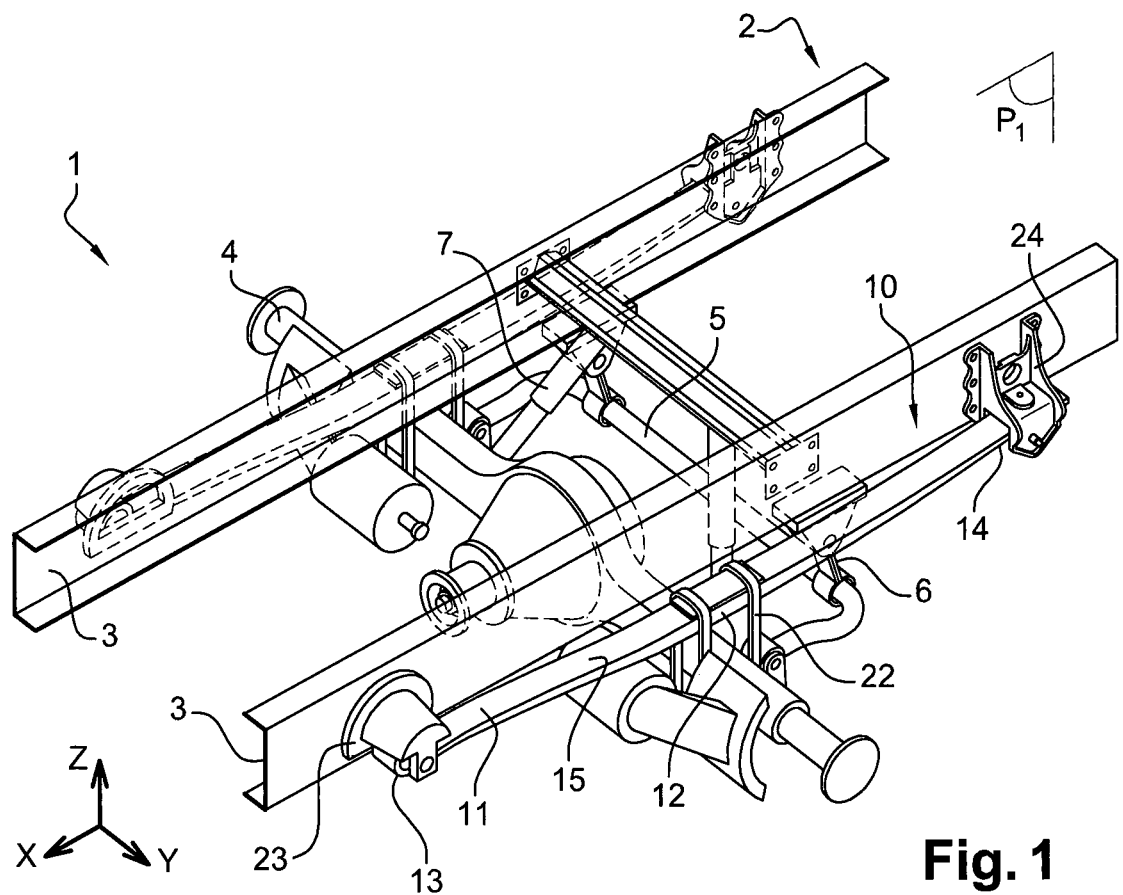
FIG. 1 is a partial perspective view of a vehicle, showing a frame, an axle, and a suspension system of the axle.
Figure 2:
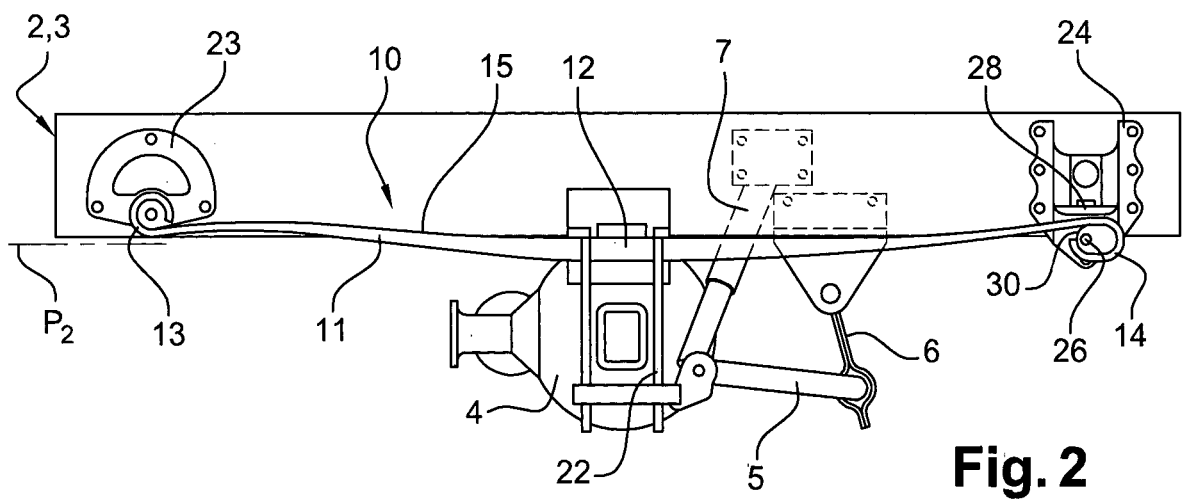
FIG. 2 is a side view of FIG. 1.

FIG. 1 is a partial view of a vehicle 1 comprising a frame 2 including two girders 3, and an axle 4 mounted on the frame 2.

The longitudinal direction X is defined as the longitudinal direction of the vehicle 1 and of the girders 3. The transverse direction Y is the direction of the axle 4, and Z is the vertical direction.

The mounting assembly between the axle 4 and the frame includes a stabilizer bar 5 secured to the frame 2 by means of stabilizer rods 6, at least one cylinder 7, and a suspension system 10 which will now be described.

The suspension system 10 being substantially symmetrical with respect to the vehicle median longitudinal plane P1, only one side of the suspension system 10 will be described.

The suspension system 10 comprises a leaf spring 11 which is preferably a single leaf spring. The leaf spring 11 extends longitudinally along the outer face of the corresponding girder 3, near the lower edge of said girder 3. The leaf spring 11, which can typically be made of metal such as steel, is a substantially flat piece lying in a plane P2, except at its end portions, and has a substantially horizontal upper face 15 (when the vehicle is on a horizontal ground). The width of the leaf spring 11 can be substantially identical over the whole length.

The leaf spring 11 comprises an intermediate portion 12 engaged in an intermediate attachment device 22 which supports the axle 4. The leaf spring 11 also comprises a front end portion 13 engaged in a front attachment device 23 and a rear end portion 14 engaged in a rear attachment device 24, the front and rear attachment devices 23, 24 being secured to the vehicle frame 2, for example on the outer surface of the corresponding girder 3.

Figure 3:
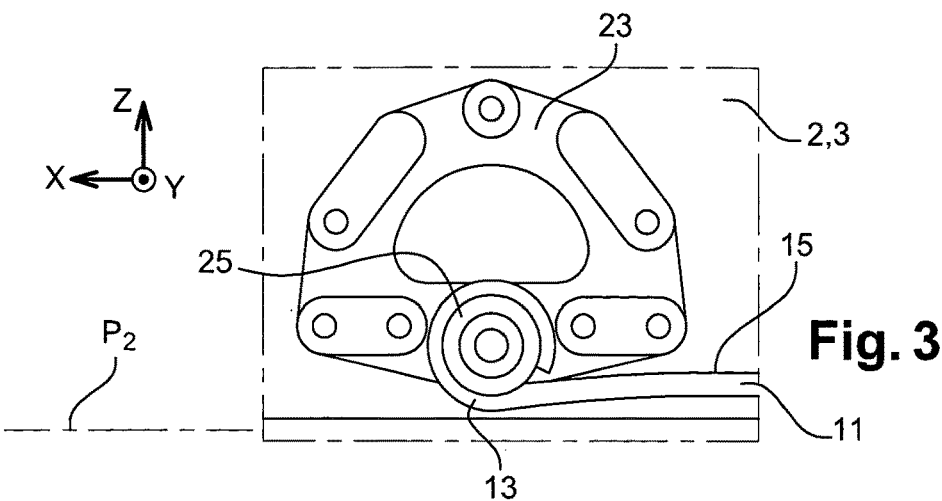
FIG. 3 is an enlarged side view of the front end portion of the suspension system of FIG. 1.

As can be seen on FIG. 3, the front end portion 13 can have the shape of a loop rolled around a transverse axis' can be arranged around a bushing 25 connected to the front attachment device 23. With such an arrangement, the front end portion 13 of the leaf spring 11 cannot move longitudinally relative to the front attachment device 23, i.e. relative to the frame 2. The front end portion 13 is rolled above the leaf spring 11 and can be located above the plane P2. It is underlined that, in FIG. 3, only the part of the front attachment device 23 fastened to the frame 2 is illustrated, to show the front end portion 13 of the leaf spring 11. However, as can be seen on FIG. 1, the front attachment device 23 also comprises an outer part to form a housing for the leaf spring front end portion 13.

On the contrary, the suspension system 10 is configured so that the leaf spring rear end portion 14 can slide longitudinally relative to the rear attachment device 24 in order to accommodate the vertical movements of the axle 4.

To that end, the leaf spring rear end portion 14 forms at least part of a loop which is curved around a transverse axis, which is longitudinally elongated and rolled on the underside of the leaf spring 11. In other words, the loop or partial loop is arranged under the upper face 15 of the leaf spring 11; besides, the loop or partial loop has a length—along direction X—that is greater than its height—along direction Z.

The rear attachment device 24 comprises a fastener 26, preferably equipped with a bushing 27, which extends substantially transversally and is received in the loop or partial loop of the leaf spring rear end portion 14. Furthermore, a pad 28 is secured on the rear attachment device 24 and is in contact with the upper face 15 of the leaf spring rear end portion 14.

In normal use, thanks to the vehicle's total load, the rear end portion 14 of the leaf spring remains in contact with the pad 28. Indeed, the action between the force exerted by the load applied vertically downwards from the top of the frame 2 and the force exerted from the ground via the wheels enables a permanent contact between the leaf spring 11 and the pad 28.

In very particular cases e.g. holes on the road, or when the vehicle frame is raised e.g. using a hanging bridge for maintenance purpose, there is a moment in time during which there is no force exerted from the ground and the action is therefore lost.

In these particular cases, the movement being essentially vertical, the fastener 26 ensures that the rear end portion 14 of the leaf spring 11 is maintained in the rear attachment device 24.

It has to be noted that, in FIGS. 4-7, only the part of the rear attachment device 24 fastened to the frame 2 is illustrated, to show the rear end portion 14 of the leaf spring 11. However, as can be seen on FIG. 1, the rear attachment device 24 also comprises an outer part to form a housing for the leaf spring rear end portion 14.

The leaf spring rear end portion 14 has an opening 29 which is located at least at the front, i.e. the loop or partial loop opens at least toward the front.

Figure 4:
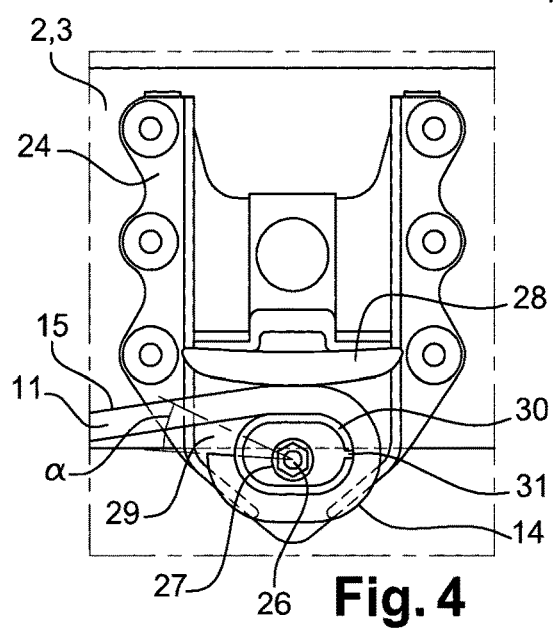
FIG. 4-7 are schematic enlarged side views of the rear end portion of the suspension system of FIG. 1, according to various embodiments.
Figure 5:
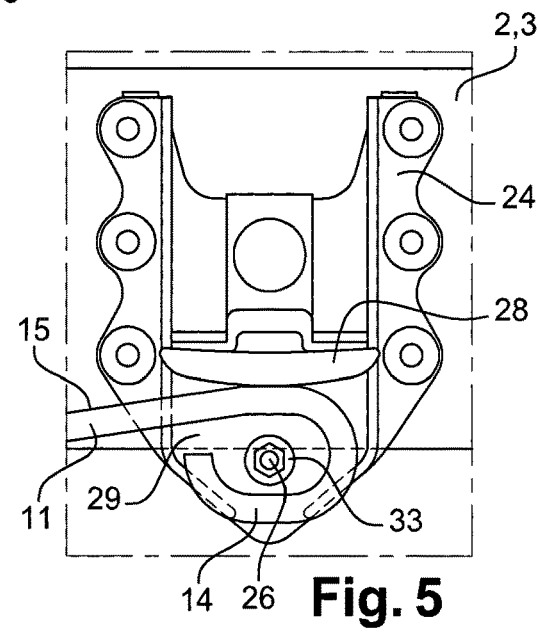
Figure 6:
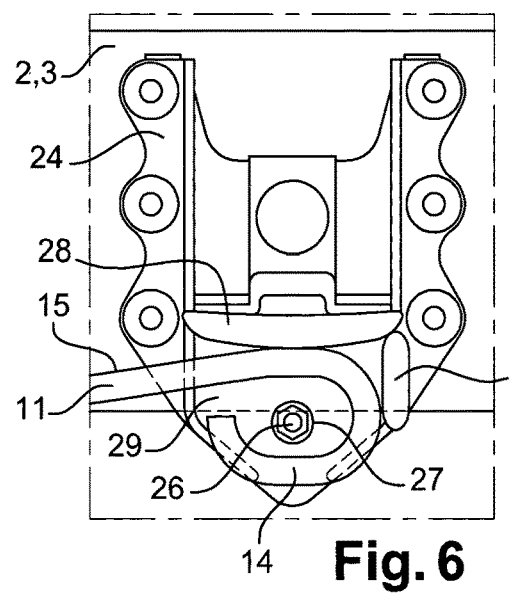

In an embodiment, as shown in FIGS. 4 to 6, the leaf spring rear end portion 14 is designed as a nearly closed loop, with the opening 29 extending over an angle $\alpha$ ranging from 10° to 20°, for example, and located at the front upper portion of the leaf spring rear end portion 14.

Figure 7:
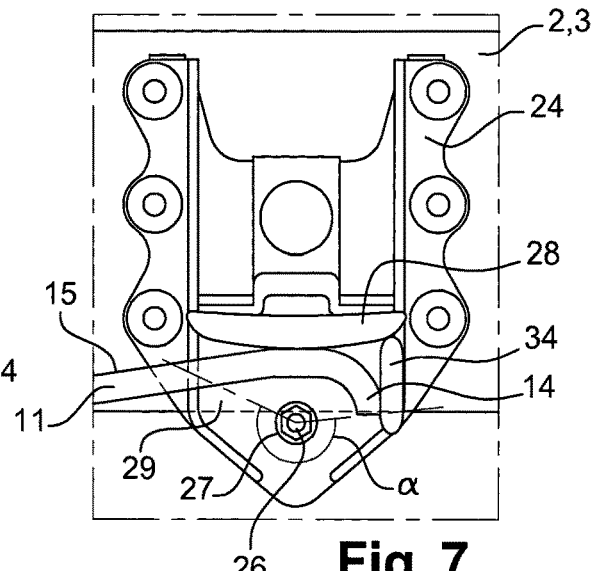

In another embodiment, as shown in FIG. 7, the leaf spring rear end portion 14 forms a partial loop having an opening 29 which is located both at the front portion and at the bottom portion of the leaf spring rear end portion 14, and possibly also at the bottom rear portion thereof. The opening 29 may extend over an angle $\alpha$ of at least 180°, for example around 210°. Thus, the leaf spring rear end portion 14 has a curved rear surface which can extend substantially down to the fastener 26, in the vertical direction Z.

The leaf spring rear end portion 14 can move longitudinally relative to the rear attachment device 24, in the forward direction and preferably also in the rearward direction, with the fastener 26 moving inside the loop or partial loop and the leaf spring upper face 15 sliding against the pad 28. To ensure the vehicle safely, especially in case the leaf spring 11 is broken at its front portion and therefore is no more maintained longitudinally in the front attachment device 23, the invention provides retaining means configured to prevent the fastener 26 from getting out of the loop or partial loop through the opening 29. In order words, the retaining means are configured to limit the longitudinal movement of the leaf spring 11 relative to the rear attachment device 24 below a predetermined limit.

According to a first embodiment, illustrated in FIG. 4, the retaining means comprises a closure element 30 for at least partially closing the opening 29. The closure element 30 can be a piece separate from the leaf spring 11, arranged inside the loop so as to at least partially face the opening 29. The closure element 30 can be made of metal, such as steel.

The closure element 30 can be substantially ring-shaped and can be elastically radially inwardly deformable from a rest position in which its radial dimensions are greater than the corresponding inner dimensions of the leaf spring rear end portion 14. To that end, the closure element 30 may be provided with a radial slot 31. Thus, the closure element 30 may be compressed, with the width of slot 31 being decreased, and then inserted in the loop forming the leaf spring rear end portion 14. Releasing the closure element 30 will result in said closure element 30 expanding back towards its rest position, thereby being pressed against the inner surface of the loop. The slot 31 may preferably be located towards the rear, i.e. opposite the opening 29. In the operative position, the closure element 30 may have substantially the same oblong shape as the inner surface of the loop forming the leaf spring rear end portion 14.

Owing to this arrangement, as the opening 29 is closed, the fastener 26 cannot pass through said opening 29 even if its diameter is smaller than the dimension of the opening 29. In other words, the closure element 30 prevents a longitudinal movement of the leaf spring 11 rearward, above a predetermined limit.

In an alternative of this embodiment, the closure element 30 may close only part of the opening 29, provided the remaining open portion of said opening 29 is smaller than the diameter of the fastener 26.

According to a second embodiment, illustrated in FIG. 5, the retaining means comprises a blocking element 33 arranged on the fastener 26, and configured to increase a dimension of the fastener 26. This blocking element 33 can be a sleeve arranged around a pin forming at least part of the fastener 26, in order to increase the diameter of the fastener 26, and make it greater than the opening 29. As a consequence, the fastener 26 equipped with this blocking element 33 is prevented from passing through the opening 29 of the leaf spring rear end portion 14.

FIGS. 6 and 7 show a third embodiment of the invention, in which the retaining means comprises a wall 34 which is secured to the rear attachment device 24, rearward of the leaf spring rear end portion 14. This wall 34 can be made as a single piece with the rear attachment device 24 or designed as a separate piece subsequently secured to the rear attachment device 24. The wall 34 can be arranged substantially vertically.

The wall 34 forms a stop which cooperates with the curved rear end surface of the leaf spring rear end portion 14, whether said rear end portion 14 forms a substantially full loop or a partial loop. As a consequence, the rearward longitudinal movement of the leaf spring 11 relative to the rear attachment device 24 is prevented above a predetermined limit. The wall 34 can be located so as to allow some rearward movement of the leaf spring 11 up to a predetermined limit, or to prevent any rearward movement of the leaf spring 11 relative to the rear attachment device 24.

Providing a leaf spring rear end portion 14 having a curved rear wall rather than being substantially flat and horizontal is advantageous, even if said rear end portion 14 does not form a substantially closed loop, but only a partial loop. On the one hand, such an arrangement provides a greater contact surface with the wall 34, and therefore ensures an efficient stop of the leaf spring movement. On the other hand, the curved rear wall forms a hook which further prevents or limits a forward movement of the leaf spring 11 relative to the rear attachment device 24, when said curved rear wall comes into contact with the fastener 26.

It is to be understood that the present invention is not limited to the embodiments described above and illustrated in the drawings; rather, the skilled person will recognize that many changes and modifications may be made within the scope of the appended claims.

The invention claimed is:

1. A suspension system of a vehicle axle, comprising
a leaf spring having a longitudinal axis and a transverse axis, one end portion of the leaf spring forming at least part of a loop curved around the transverse axis, the loop being longitudinally elongated and having an opening located at least at the front of the loop; and
a rear attachment device comprising a fastener extending substantially transversally and received in the loop, the rear attachment device is configured to be secured to a vehicle frame and receiving a rear end portion of the leaf spring so as to allow the leaf spring rear end portion to slide longitudinally relative to the rear attachment device; and a closure element facing the opening of the leaf spring rear end portion for at least partially closing the opening, the closure element configured to allow movement of the fastener relative to the closure element and prevent the fastener from getting out of the loop through the opening.

2. The suspension system according to claim 1, wherein the leaf spring comprises a single leaf spring.

3. The suspension system according to claim 1, wherein the closure element is a piece separate from the leaf spring.

4. The suspension system according to claim 1, wherein the opening of the leaf spring rear end portion extends over an angle about a center axis of the loop of at least 10°.

5. The suspension system according to claim 1, wherein the opening of the leaf spring rear end portion extends over an angle about a center axis of the loop which is less than 40°.

6. The suspension system according to claim 1, wherein the closure element is located inside the leaf spring rear end portion.

7. The suspension system according to claim 1, wherein the closure element is located outside the leaf spring rear end portion.

8. The suspension system according to claim 1, wherein the closure element is substantially ring-shaped and located inside the loop.

9. The suspension system according to claim 8, wherein the closure element is elastically radially inwardly deformable from a rest position in which radial dimensions are greater than the corresponding inner dimensions of the leaf spring rear end portion.

10. The suspension system according to claim 1, wherein the closure element comprises a blocking element arranged on the fastener and configured to increase a dimension of the fastener to prevent the fastener to pass through the opening of the leaf spring rear end portion.

11. The suspension system according to claim 10, wherein the fastener comprises a pin and in that the blocking element comprises a sleeve arranged around the pin.

12. The suspension system according to claim 1, wherein the closure element comprises a wall secured to the rear attachment device, rearward of the leaf spring rear end portion, the wall being arranged to form a stop preventing or limiting the rearward movement of the leaf spring.

13. The suspension system according to claim 12, the leaf spring rear end portion having a curved rear surface for cooperating with the wall.

14. The suspension system according to claim 1, further comprising a pad which is secured on the rear attachment device and which is in contact with the upper face of the leaf spring rear end portion.

15. The suspension system according to claim 1, further comprising a front attachment device configured to be secured to the vehicle frame and an intermediate attachment device, the leaf spring comprising a front end portion which is engaged in the front attachment device and an intermediate portion engaged in the intermediate attachment device for attaching the vehicle axle to the vehicle frame.

* * * * *